(12) United States Patent
Wang et al.

(10) Patent No.: US 10,885,919 B2
(45) Date of Patent: Jan. 5, 2021

(54) ROUTING SYSTEM AND METHOD (71) Applicant: Nuance Communications, Inc., Burlington, MA (US)

(72) Inventors: Songzhe Wang, Verdun (CA); Lior Ben-Gigi, Hampstead (CA); Slawek Jarosz, Senneville (CA); David Ardman, Cote Saint Luc (CA); Stefan Ortmanns, Monschau (DE)

(73) Assignee: Nuance Communications, Inc., Burlington, MA (US)

( * ) Notice: Subject to any disclaimer, the term of this patent is extended or adjusted under 35 U.S.C. 154(b) by 64 days.

(21) Appl. No.: 15/863,310

(22) Filed: Jan. 5, 2018

(65) Prior Publication Data

US 2019/0214016 A1 Jul. 11, 2019

(51) Int. Cl.
| | | |
|---|---|---|
| *G10L 15/32* | (2013.01) | |
| *G10L 25/51* | (2013.01) | |
| *G10L 15/30* | (2013.01) | |
| *G10L 15/18* | (2013.01) | |
| *G10L 15/22* | (2006.01) | |

(52) U.S. Cl.
CPC .......... *G10L 15/32* (2013.01); *G10L 15/1815* (2013.01); *G10L 15/22* (2013.01); *G10L 15/30* (2013.01); *G10L 25/51* (2013.01); *G10L 2015/223* (2013.01)

(58) Field of Classification Search
CPC ..... G10L 15/32; G10L 15/1815; G10L 15/22; G10L 15/30; G10L 25/51
See application file for complete search history.

(56) References Cited

U.S. PATENT DOCUMENTS

| | | | | |
|---|---|---|---|---|
| 6,226,749 B1 * | 5/2001 | Carloganu | ............. | G06F 21/31 726/2 |
| 6,836,760 B1 * | 12/2004 | Bellegarda | .......... | G10L 15/1822 704/238 |
| 8,515,736 B1 * | 8/2013 | Duta | ................... | G10L 15/1822 704/9 |
| 8,761,373 B1 * | 6/2014 | Raghavan | ........... | H04M 3/4936 379/111 |
| 8,838,434 B1 * | 9/2014 | Liu | ........................ | G06F 40/58 704/2 |
| 8,983,840 B2 * | 3/2015 | Deshmukh | .............. | G10L 15/18 704/257 |
| 9,131,369 B2 * | 9/2015 | Ganong, III | ......... | H04W 12/02 |
| 9,405,832 B2 * | 8/2016 | Edwards | ............... | G06F 16/951 |
| 9,484,021 B1 * | 11/2016 | Mairesse | ................. | G10L 15/08 |
| 9,619,459 B2 * | 4/2017 | Hebert | ................ | G06F 17/2785 |

(Continued)

*Primary Examiner* — Mohammad K Islam
(74) *Attorney, Agent, or Firm* — Brian J. Colandreo; Michael T. Abramson; Holland & Knight, LLP (57) ABSTRACT

A method, computer program product, and computing system for monitoring a portion of speech on an automated speech recognition system that includes a plurality of classifiers, thus defining a monitored portion of speech, wherein an operation is defined for each of the plurality of classifiers. A confidence score concerning the monitored portion of speech is associated with each of a plurality of classifiers, thus defining a plurality of confidence scores. If one of the plurality of confidence scores is an acceptable confidence score, the operation defined for the classifier associated with the acceptable confidence score is effectuated.

18 Claims, 2 Drawing Sheets

(56) References Cited

U.S. PATENT DOCUMENTS

| | | | |
|---|---|---|---|
| 2006/0025995 A1* | 2/2006 | Erhart | G10L 15/1822 704/239 |
| 2006/0149544 A1* | 7/2006 | Hakkani-Tur | G10L 15/22 704/236 |
| 2010/0268536 A1* | 10/2010 | Suendermann | G10L 15/063 704/243 |
| 2013/0159000 A1* | 6/2013 | Ju | G10L 15/1822 704/254 |
| 2013/0326353 A1* | 12/2013 | Singhal | G06F 3/167 715/728 |
| 2014/0058732 A1* | 2/2014 | Labsky | G10L 15/30 704/254 |
| 2014/0207442 A1* | 7/2014 | Ganong, III | H04W 12/02 704/201 |
| 2015/0012271 A1* | 1/2015 | Peng | G10L 15/08 704/235 |
| 2015/0120288 A1* | 4/2015 | Thomson | G10L 15/22 704/231 |
| 2016/0012819 A1* | 1/2016 | Willett | G10L 15/20 704/233 |
| 2017/0177716 A1* | 6/2017 | Perez | G06F 16/35 |
| 2017/0278511 A1* | 9/2017 | Willett | G10L 25/84 |
| 2017/0278514 A1* | 9/2017 | Mathias | G10L 15/22 |
| 2017/0294184 A1* | 10/2017 | Bradley | G10L 15/04 |
| 2018/0060326 A1* | 3/2018 | Kuo | G06Q 50/01 |
| 2018/0197545 A1* | 7/2018 | Willett | G10L 15/30 |
| 2018/0211663 A1* | 7/2018 | Shin | G10L 15/1815 |
| 2018/0247065 A1* | 8/2018 | Rhee | G07C 9/00087 |
| 2018/0308487 A1* | 10/2018 | Goel | G10L 15/1815 |
| 2018/0330728 A1* | 11/2018 | Gruenstein | H04L 63/1458 |
| 2019/0027138 A1* | 1/2019 | Wang | G10L 15/02 |
| 2019/0043509 A1* | 2/2019 | Suppappola | G10L 17/22 |
| 2019/0043529 A1* | 2/2019 | Muchlinski | G10L 25/84 |
| 2019/0057690 A1* | 2/2019 | Fry | G10L 15/22 |
| 2019/0057693 A1* | 2/2019 | Fry | G10L 15/22 |
| 2020/0051554 A1* | 2/2020 | Kim | G10L 15/22 |

* cited by examiner

ROUTING SYSTEM AND METHOD

TECHNICAL FIELD

This disclosure relates to routing systems and, more particularly, to routing systems for use within consumer electronic devices.

BACKGROUND

Today's consumer electronic devices are often controllable via voice commands. For example, these consumer electronic devices may include speech recognition systems that may convert the user's voice commands into commands that are usable by the consumer electronic device. Accordingly, the user may issue a voice command that may be processed by the consumer electronics device to generate a command that may be mapped onto the available functionality of the consumer electronic device.

Unfortunately, the voice interfaces in these consumer electronic devices may be underwhelming. For example, these speech recognition systems may not be self-activating. Therefore and when controlling these consumer electronic devices, the user may be required to manually activate the speech recognition system by depressing a button or by saying specific words (e.g., trigger/wake-up words).

SUMMARY OF DISCLOSURE

In one implementation, a computer-implemented method is executed on a computing system and includes monitoring a portion of speech on an automated speech recognition system that includes a plurality of classifiers, thus defining a monitored portion of speech, wherein an operation is defined for each of the plurality of classifiers. A confidence score concerning the monitored portion of speech is associated with each of a plurality of classifiers, thus defining a plurality of confidence scores. If one of the plurality of confidence scores is an acceptable confidence score, the operation defined for the classifier associated with the acceptable confidence score is effectuated.

One or more of the following features may be included. A semantic result may be received in response to effectuating the operation defined for the classifier associated with the acceptable confidence score. Each of the plurality of classifiers may define one or more elements. Associating a confidence score concerning the monitored portion of speech with each of a plurality of classifiers may include comparing the monitored portion of speech to the one or more elements defined for each of the plurality of classifiers. The plurality of classifiers may include: a negative classifier, wherein the operation associated with the negative classifier is configured to ignore the monitored portion of speech; an embedded classifier, wherein the operation associated with the embedded classifier is configured to locally process the monitored portion of speech on a consumer electronic device; and a gate classifier, wherein the operation associated with the gate classifier is configured to remotely process the monitored portion of speech on a remote computing platform. The monitored portion of speech may be transcribed, thus defining a transcribed portion of speech. The transcribed portion of speech may be provided to the remote computing platform.

In another implementation, a computer program product resides on a computer readable medium and has a plurality of instructions stored on it. When executed by a processor, the instructions cause the processor to perform operations including monitoring a portion of speech on an automated speech recognition system that includes a plurality of classifiers, thus defining a monitored portion of speech, wherein an operation is defined for each of the plurality of classifiers. A confidence score concerning the monitored portion of speech is associated with each of a plurality of classifiers, thus defining a plurality of confidence scores. If one of the plurality of confidence scores is an acceptable confidence score, the operation defined for the classifier associated with the acceptable confidence score is effectuated.

One or more of the following features may be included. A semantic result may be received in response to effectuating the operation defined for the classifier associated with the acceptable confidence score. Each of the plurality of classifiers may define one or more elements. Associating a confidence score concerning the monitored portion of speech with each of a plurality of classifiers may include comparing the monitored portion of speech to the one or more elements defined for each of the plurality of classifiers. The plurality of classifiers may include: a negative classifier, wherein the operation associated with the negative classifier is configured to ignore the monitored portion of speech; an embedded classifier, wherein the operation associated with the embedded classifier is configured to locally process the monitored portion of speech on a consumer electronic device; and a gate classifier, wherein the operation associated with the gate classifier is configured to remotely process the monitored portion of speech on a remote computing platform. The monitored portion of speech may be transcribed, thus defining a transcribed portion of speech. The transcribed portion of speech may be provided to the remote computing platform.

In another implementation, a computing system includes a processor and memory is configured to perform operations including monitoring a portion of speech on an automated speech recognition system that includes a plurality of classifiers, thus defining a monitored portion of speech, wherein an operation is defined for each of the plurality of classifiers. A confidence score concerning the monitored portion of speech is associated with each of a plurality of classifiers, thus defining a plurality of confidence scores. If one of the plurality of confidence scores is an acceptable confidence score, the operation defined for the classifier associated with the acceptable confidence score is effectuated.

One or more of the following features may be included. A semantic result may be received in response to effectuating the operation defined for the classifier associated with the acceptable confidence score. Each of the plurality of classifiers may define one or more elements. Associating a confidence score concerning the monitored portion of speech with each of a plurality of classifiers may include comparing the monitored portion of speech to the one or more elements defined for each of the plurality of classifiers. The plurality of classifiers may include: a negative classifier, wherein the operation associated with the negative classifier is configured to ignore the monitored portion of speech; an embedded classifier, wherein the operation associated with the embedded classifier is configured to locally process the monitored portion of speech on a consumer electronic device; and a gate classifier, wherein the operation associated with the gate classifier is configured to remotely process the monitored portion of speech on a remote computing platform. The monitored portion of speech may be transcribed, thus defining a transcribed portion of speech. The transcribed portion of speech may be provided to the remote computing platform.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
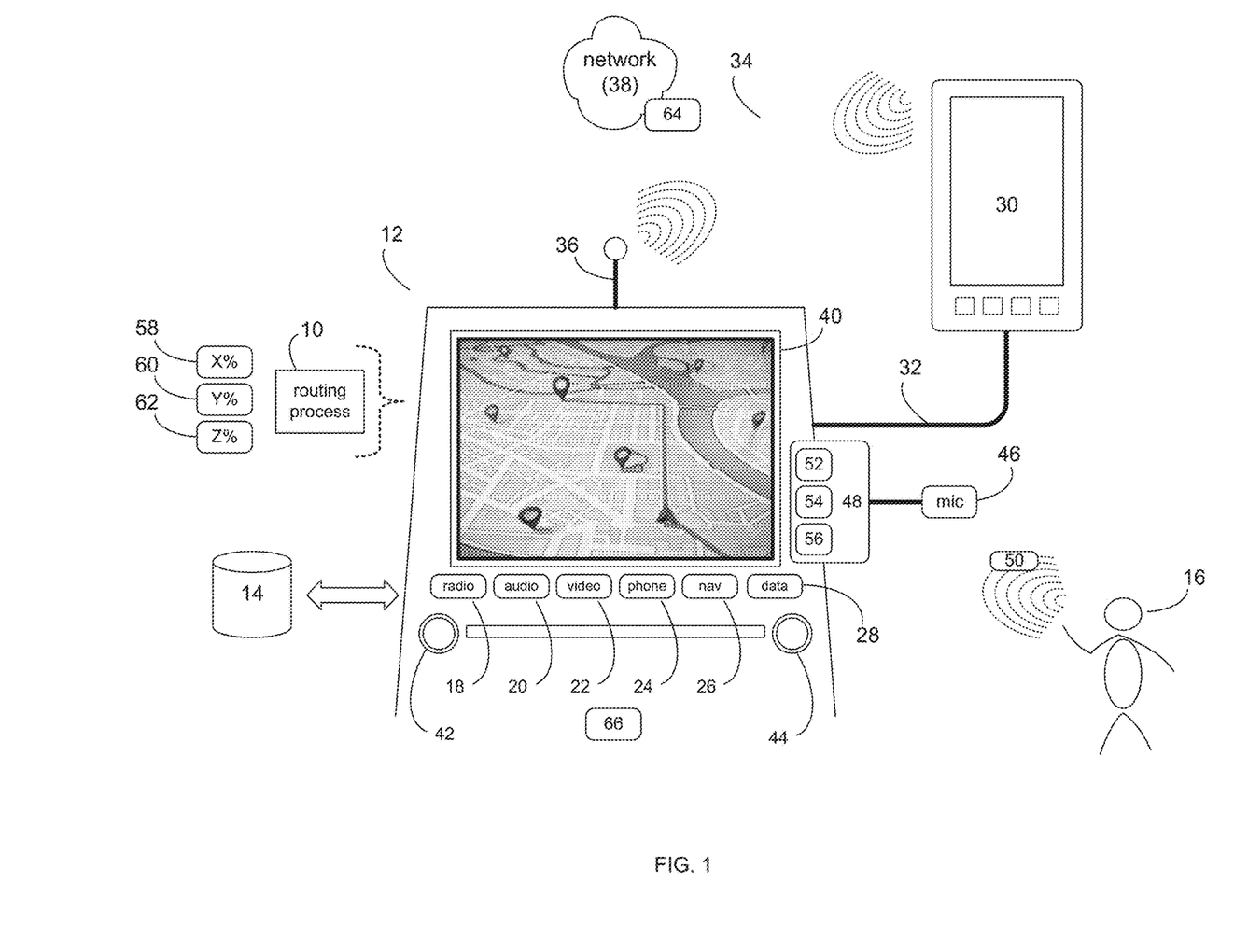
FIG. 1 is a diagrammatic view of a consumer electronic device that executes a routing process according to an embodiment of the present disclosure.

Referring to FIG. 1, there is shown routing process 10. Routing process 10 may reside on and may be executed by consumer electronic device 12. Examples of consumer electronic device 12 may include but are not limited to a vehicle infotainment system (e.g., vehicle navigation systems, vehicle music systems, vehicle video systems, vehicle phone systems, and vehicle climate control systems).

The instruction sets and subroutines of routing process 10, which may be stored on storage device 14 coupled to consumer electronic device 12, may be executed by one or more processors (not shown) and one or more memory architectures (not shown) included within consumer electronic device 12. Examples of storage device 14 may include but are not limited to: a hard disk drive; a RAID device; a random access memory (RAM); a read-only memory (ROM); and all forms of flash memory storage devices. Consumer electronic device 12 may execute an operating system, examples of which may include but are not limited to Microsoft Windows™, Android™, iOS™, Linux™, or a custom operating system.

When configured as a vehicle infotainment system, consumer electronic device 12 may be configured to execute various different functionalities that may be of interest/useful to a user (e.g., user 16). Examples of such functionalities may include but are not limited to: radio functionality (e.g., that enables the playing of terrestrial radio stations and satellite radio stations); audio functionality (e.g., that enables the playing of audio, wherein this audio may be disc-based or locally stored on storage device 14); video functionality (e.g., that enables the playing of video, wherein this video may be disc-based or locally stored on storage device 14); phone functionality (e.g., that enables the placing and receiving of phone calls); navigation functionality (e.g., that enables the execution of navigation/guidance functionality); data functionality (e.g., that enables the sending and receiving of email/text messages/instant messages, the obtaining of data on various topics, and the streaming of remote content); and vehicle control functionality (e.g., that enables the user to adjust various aspects of the vehicle in which consumer electronic device 12 is installed).

When configured as a vehicle infotainment system, consumer electronic device 12 may include a plurality of buttons (e.g., physical buttons or electronic buttons) that enable the selection of the above-described functionality. For example, the above-described radio functionality may be selectable via "radio" button 18; the above-described audio functionality may be selectable via "audio" button 20; the above-described video functionality may be selectable via "video" button 22; the above-described phone functionality may be selectable via "phone" button 24; the above-described navigation functionality may be selectable via "nav" button 26; and the above-described data functionality may be selectable via "data" button 28.

When configured as a vehicle infotainment system, consumer electronic device 12 may be configured to interface with one or more external systems (e.g., external system 30). Examples of external system 30 may include but are not limited to: a cellular telephone; a smart phone; a tablet computing device; a portable computing device; a network access point, and a handheld entertainment device (e.g., such as a gaming device). When interfacing with consumer electronic device 12, external system 30 may be releasably coupled to consumer electronic device 12 via a hardwired connection (e.g., USB cable 32). Alternatively, external system 30 may be wirelessly coupled to consumer electronic device 12 via wireless communication channel 34 established between external system 30 and antenna 36 of consumer electronic device 12. An example of wireless communication channel 34 may include but is not limited to a Bluetooth communication channel. As is known in the art, Bluetooth is a telecommunications industry specification that allows e.g., mobile phones, computers, and personal digital assistants to be interconnected using a short-range wireless connection.

Consumer electronic device 12 and/or external system 30 may be configured to be wirelessly coupled to/access an external network (e.g., network 38). Examples of network 38 may include but are not limited to the internet, a cellular network, a WiFi network, and/or a cloud-based computing platform.

Consumer electronic device 12 may also include display screen 40 and one or more knobs/dials 42, 44 that effectuate the use of such functionalities. Consumer electronic device 12 may include microphone assembly 46 and automated speech recognition system 48 (such as those available from Nuance Communications, Inc. of Burlington, Mass.). Accordingly, consumer electronic device 12 may be configured to accept utterances (e.g., utterance 50) that may be spoken and provided by (in this example) user 16. As will be discussed below in greater detail, these utterances (e.g., utterance 50) may be configured to allow user 16 to access and control the above-described functionalities in a hands-free fashion.

As discussed above, consumer electronic device 12 may be configured to execute various different functionalities that may be of interest/useful to a user (e.g., user 16). Some of these functionalities may be locally-resident on (provided by) consumer electronic device 12, while other functionalities may be remotely-resident on (provided by) external system 30 and/or network 38.

Examples of such locally-resident functionalities may include: radio functionality (e.g., that enables the playing of terrestrial radio stations and satellite radio stations); audio functionality (e.g., that enables the playing of audio, wherein this audio may be disc-based or locally stored on storage device 14); video functionality (e.g., that enables the playing of video, wherein this video may be disc-based or locally stored on storage device 14); phone functionality (e.g., that enables the placing and receiving of phone calls); navigation functionality (e.g., that enables the execution of local navigation/guidance functionality); and vehicle control functionality (e.g., that enables the user to adjust various aspects of the vehicle in which consumer electronic device 12 is installed). Examples of such remotely-resident functionalities may include: data functionality (that enables user 16 to send/receive email, send/receive text messages and/or send/receive instant messages, obtain data on various topics, and stream remote content).

The Routing Process

Since consumer electronic device 12 may be configured to execute various different functionalities that may be of interest/useful to a user (e.g., user 16), wherein some of these functionalities may be locally-resident on (provided by) consumer electronic device 12 and other functionalities may be remotely-resident on (provided by) external system 30 and/or network 38; routing process 10 may be configured to automatically rout the above-described voice commands (e.g., utterance 50) to the appropriate system without requiring that the user (e.g., user 16) manually activate automated speech recognition system 48.

Automated speech recognition system 48 may utilize a plurality of classifiers (e.g., classifiers 52, 54, 56), wherein each of the plurality of classifiers (e.g., classifiers 52, 54, 56) may be associated with a different type of operation with respect to consumer electronic device 12 and/or automated speech recognition system 48. For example, the plurality of classifiers may include:

a negative classifier (e.g., classifier 52), wherein the operation associated with negative classifier 52 may be configured to ignore a monitored portion of speech (e.g., some or all of utterance 50);

an embedded classifier (e.g., classifier 54), wherein the operation associated with embedded classifier 54 may be configured to locally process the monitored portion of speech (e.g., some or all of utterance 50) on consumer electronic device 12; and a gate classifier (e.g., classifier 56), wherein the operation associated with gate classifier 56 may be configured to remotely process the monitored portion of speech (e.g., some or all of utterance 50) on a remote computing platform (e.g., remote computing device 30 and/or network 38).

Figure 2:
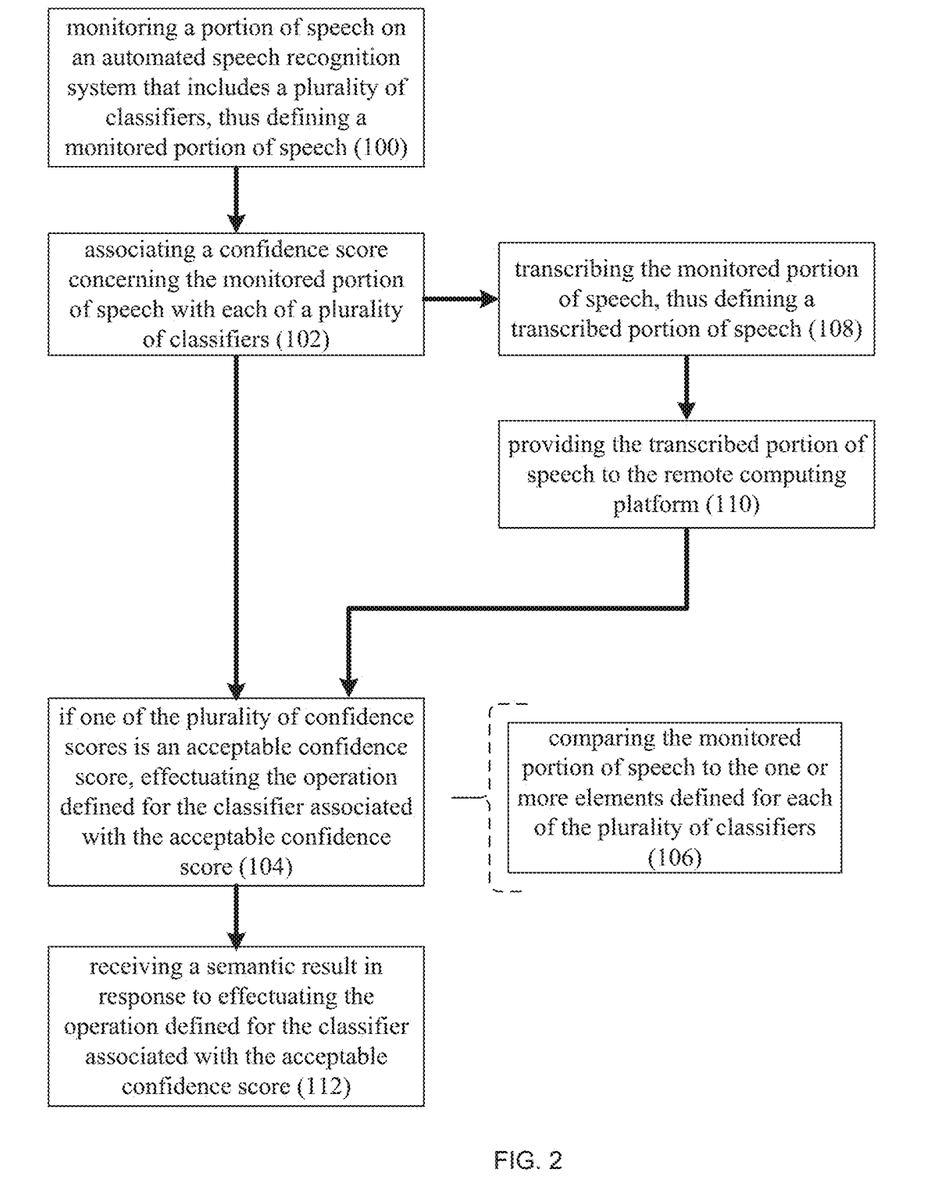
FIG. 2 is a flowchart of the routing process of FIG. 1 according to an embodiment of the present disclosure.

Referring also to FIG. 2, routing process 10 may monitor 100 a portion of speech (e.g., utterance 50) on automated speech recognition system 48, thus defining a monitored portion of speech. For example, microphone assembly 46 and automated speech recognition system 48 may be configured to always be active, so that any and all utterances that are made proximate consumer electronic device 12 (e.g., inside of the vehicle in which consumer electronic device 12 is installed) may be processed by automated speech recognition system 48 and routing process 10. Accordingly and when configured in such a manner, this system may be self-activating, as the user is not required to manually activate the system by e.g., depressing a button or by saying specific words (e.g., trigger/wake-up words). For this example, utterance 50 may be any portion of speech (be it individual words, groups of words, sentences, groups of sentences, or entire discussions), wherein a maximum utterance length may be defined for the portion of speech (e.g., utterance 50), so as to avoid overly complicated processing and loading of the system (as will be explained below in greater detail).

Accordingly and as utterances (e.g., utterance 50) are made e.g., inside the vehicle in which consumer electronic device 12 is installed, routing process 10 may monitor 100 these portions of speech (e.g., utterance 50) and may associate 102 a confidence score concerning the monitored portion of speech (e.g., utterance 50) with each of a plurality of classifiers (e.g., classifiers 52, 54, 56), thus defining a plurality of confidence scores (e.g., confidence scores 58, 60, 62). If one of the plurality of confidence scores (e.g., confidence scores 58, 60, 62) is an acceptable confidence score, routing process 10 may effectuate 104 the operation defined for the classifier (e.g., classifiers 52, 54, 56) associated with the acceptable confidence score.

Specifically, the confidence scores (e.g., confidence scores 58, 60, 62) may define the level of confidence that routing process 10 and/or automated speech recognition system 48 has that the monitored portion of speech (e.g., utterance 50) is applicable to a specific classifier (e.g., classifiers 52, 54, 56). As discussed above, each of the plurality of classifiers (e.g., classifiers 52, 54, 56) may be associated with a different type of operation with respect to consumer electronic device 12 and/or automated speech recognition system 48, wherein:

the operation associated with the negative classifier (e.g., classifier 52) may be configured to ignore the monitored portion of speech (e.g., some or all of utterance 50);

the operation associated with the embedded classifier (e.g., classifier 54) may be configured to locally process the monitored portion of speech (e.g., some or all of utterance 50) on consumer electronic device 12; and the operation associated with the gate classifier (e.g., classifier 56) may be configured to remotely process the monitored portion of speech (e.g., some or all of utterance 50) on a remote computing platform (e.g., remote computing device 30 and/or network 38).

Accordingly, if confidence score 58 (which is associated with classifier 52) is a "high" confidence score, it is "likely" that the monitored portion of speech (e.g., utterance 50) should be "ignored" and no action should be taken. Alternatively, if confidence score 58 (which is associated with classifier 52) is a "low" confidence score, it is "unlikely" that the monitored portion of speech (e.g., utterance 50) should be "ignored" and some action should be taken (e.g., it should be locally processed or remotely processed).

Additionally, if confidence score 60 (which is associated with classifier 54) is a "high" confidence score, it is "likely" that the monitored portion of speech (e.g., utterance 50) should be "locally processed" (e.g., by consumer electronic device 12). Alternatively, if confidence score 60 (which is associated with classifier 54) is a "low" confidence score, it is "unlikely" that the monitored portion of speech (e.g., utterance 50) should be "locally processed" and some other action should be taken (e.g., it should be ignored or remotely processed).

Further, if confidence score 62 (which is associated with classifier 56) is a "high" confidence score, it is "likely" that the monitored portion of speech (e.g., utterance 50) should be "remotely processed" on a remote computing platform (e.g., remote computing device 30 and/or network 38). Alternatively, if confidence score 62 (which is associated with classifier 56) is a "low" confidence score, it is "unlikely" that the monitored portion of speech (e.g., utterance 50) should be "remotely processed" and some other action should be taken (e.g., it should be ignored or locally processed).

The plurality of classifiers (e.g., "ignore" classifier 52, "locally process" classifier 54, and "remotely process" classifier 56) may each define one or more elements, wherein examples of these elements may include a single word, groups of words, phrases, groups of phrases, sentences, portions of conversations, or complete conversations.

Accordingly, examples of the elements included within "ignore" classifier 52 may include (but are not limited to) words, phrases, sentences and/or conversations that indicate that utterance 50 does not concern a topic that needs to be either locally processed or remotely processed. Accordingly, examples of the elements included within "ignore" classifier 52 may include (but are not limited to) "vacation", "child", "children", "I don't feel good", "I am tired", any proper name, various sounds (e.g., sneezing, coughing, snoring) and any other words, phrases, sentences and/or conversations that appear to be just normal conversations & sounds and do not concern a topic that needs to be locally or remotely processed.

Additionally, examples of the elements included within "locally process" classifier 54 may include (but are not limited to) words, phrases, sentences and/or conversations that indicate that utterance 50 concerns a topic that needs to be locally processed. Accordingly, examples of the elements included within "locally process" classifier 54 may include (but are not limited to) "seat heater", "driver's side temperature", "climate control", "tune radio to . . . ", "play CD", "Find me . . . ", "Read my . . . ", "Please call . . . ", "Play me some . . . ", "Set cruise to . . . " and any other words, phrases, sentences and/or conversations that reference, concern or are mappable onto a system/subsystem/functionality of the vehicle into which consumer electronic device 12 is installed.

Further, examples of the elements included within "remotely process" classifier 56 may include (but are not limited to) words, phrases, sentences and/or conversations that indicate that utterance 50 concerns a topic that needs to be remotely processed. Accordingly, examples of the elements included within "remotely process" classifier 56 may include (but are not limited to) "Play Pandora", "What is the weather in . . . ", "How did the stock market do?", "Did the ______ win today?", "How far away is . . . ", "What time is it in . . . " and any other words, phrases, sentences and/or conversations that reference, concern or are mappable onto a system/subsystem/functionality of the remote computing platform (e.g., remote computing device 30 and/or network 38).

When associating 102 a confidence score (e.g., confidence scores 58, 60, 62) concerning the monitored portion of speech (e.g., utterance 50) with each of a plurality of (e.g., classifiers 52, 54, 56), routing process 10 may compare 106 the monitored portion of speech (e.g., utterance 50) to the one or more elements defined for each of the plurality of classifiers (e.g., classifiers 52, 54, 56). Accordingly and continuing with the above-stated example:

if the monitored portion of speech (e.g., utterance 50) includes e.g., "vacation", "child", "children", "I don't feel good", "I am tired", any proper name, or various sounds (e.g., sneezing, coughing, snoring); confidence score 58 (which is associated with classifier 52) may be a "high" confidence score, in that it is "likely" that the monitored portion of speech (e.g., utterance 50) should be "ignored" and no action should be taken.

if the monitored portion of speech (e.g., utterance 50) includes e.g., "seat heater", "driver's side temperature", "climate control", "tune radio to . . . ", "play CD", "Find me . . . ", "Read my . . . ", "Please call . . . ", "Play me some . . . ", or "Set cruise to . . . "; confidence score 60 (which is associated with classifier 54) may be a "high" confidence score, in that it is "likely" that the monitored portion of speech (e.g., utterance 50) should be "locally processed".

if the monitored portion of speech (e.g., utterance 50) includes e.g., "Play Pandora", "What is the weather in . . . ", "How did the stock market do?", "Did the ______ win today?", "How far away is . . . ", or "What time is it in . . . "; confidence score 62 (which is associated with classifier 56) may be a "high" confidence score, in that it is "likely" that the monitored portion of speech (e.g., utterance 50) should be "remotely processed".

As discussed above, if one of the plurality of confidence scores (e.g., confidence scores 58, 60, 62) is an acceptable confidence score, routing process 10 may effectuate 104 the operation defined for the classifier (e.g., classifiers 52, 54, 56) associated with the acceptable confidence score. Accordingly:

if the monitored portion of speech (e.g., utterance 50) includes e.g., "Mom, I am really tired", confidence score 58 (which is associated with classifier 52) may be a "high" confidence score, as it is "likely" that the monitored portion of speech (e.g., utterance 50) should be "ignored" and no action should be taken. Accordingly, routing process 10 may effectuate 104 the operation defined for classifier 52 (namely the taking of no action).

if the monitored portion of speech (e.g., utterance 50) includes e.g., "Set cruise to 75 mph"; confidence score 60 (which is associated with classifier 54) may be a "high" confidence score, as it is "likely" that the monitored portion of speech (e.g., utterance 50) should be "locally processed". Accordingly, routing process 10 may effectuate 104 the operation defined for classifier 54 (namely the local processing of utterance 50 that results in the setting of the cruise control to 75 mph).

if the monitored portion of speech (e.g., utterance 50) includes e.g., "What is the weather in Las Vegas, Nevada?"; confidence score 62 (which is associated with classifier 56) may be a "high" confidence score, as it is "likely" that the monitored portion of speech (e.g., utterance 50) should be "remotely processed". Accordingly, routing process 10 may effectuate 104 the operation defined for classifier 56 (namely the remote processing of utterance 50 so that the weather in Las Vegas, Nev. may be determined).

Further and when performing a remote processing operation, routing process 10 may transcribe 108 the monitored portion of speech (e.g., utterance 50, which (in this example) is "What is the weather in Las Vegas, Nevada?"), wherein routing process 10 may provide 110 the transcription of "What is the weather in Las Vegas, Nevada?" (e.g., transcription 64) to the remote computing platform (e.g., remote computing device 30 and/or network 38) so that the remote computing platform (e.g., remote computing device 30 and/or network 38) may process the transcription.

As discussed above, a maximum utterance length may be defined for the portion of speech (e.g., utterance 50), so as to avoid overly complicated processing and loading of the system. Specifically and in order to avoid overly complicated processing and loading of the system (e.g., when making the above-described transcription, when transmitting the above-described transcription, or when remotely-processing the above-described transcription), a maximum utterance length may be defined for utterance 50, such as setting a maximum utterance length of 30 seconds.

Once the local processing or the remote processing of the monitored portion of speech (e.g., utterance 50) is completed, routing process 10 may receive 112 semantic result 66 (e.g., from consumer electronic device 12 or the remote computing platform) in response to effectuating the operation (e.g., the local processing on consumer electronic device 12 or the remote processing on the remote computing platform) defined for the classifier (e.g., "locally process"

classifier 54 or "remote process" classifier 56, respectively) associated with the acceptable confidence score.

Continuing with the above-stated example, the semantic result (e.g., semantic result 66) received 112 in response to locally processing the monitored portion of speech (e.g., utterance 50, namely "Set cruise to 75 mph") may be the setting of the cruise control to 75 mph by consumer electronic device 12.

Further and with respect to the above-stated example, the semantic result (e.g., semantic result 66) received 112 in response to remotely processing the monitored portion of speech (e.g., utterance 50, namely "What is the weather in Las Vegas, Nevada?") may be obtaining the weather in Las Vegas, Nev. (and possibly additional information such as future weather forecasts, current time, local attractions, etc.) from the remote computing platform (e.g., remote computing device 30 and/or network 38).

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing system, comprising:
    monitoring a portion of speech on an automated speech recognition system that includes a plurality of classifiers, thus defining a monitored portion of speech, wherein speech recognition for the monitored portion of speech is performed without requiring predefined speech within the monitored portion of speech, wherein a length of the monitored portion of speech is based upon, at least in part, a maximum utterance length defined for the portion of speech, wherein an operation is defined for each of the plurality of classifiers, wherein the plurality of classifiers includes:
        a negative classifier, wherein the operation associated with the negative classifier is configured to ignore the monitored portion of speech;
        an embedded classifier, wherein the operation associated with the embedded classifier is configured to locally process the monitored portion of speech on a consumer electronic device; and
        a gate classifier, wherein the operation associated with the gate classifier is configured to remotely process the monitored portion of speech on the remote location;
    associating a confidence score concerning the monitored portion of speech with each of the plurality of classifiers, thus defining a plurality of confidence scores for the plurality of classifiers concerning the monitored portion of speech, wherein the plurality of classifiers identify, at least in part, whether to process the monitored portion of speech at one of a local location and a remote location; and
    if one of the plurality of confidence scores is an acceptable confidence score for a classifier of the plurality of classifiers, effectuating the operation defined for the classifier associated with the acceptable confidence score.

2. The computer-implemented method of claim 1 further comprising:
    receiving a semantic result in response to effectuating the operation defined for the classifier associated with the acceptable confidence score.

3. The computer-implemented method of claim 1 wherein each of the plurality of classifiers defines one or more elements.

4. The computer-implemented method of claim 3 wherein associating the confidence score concerning the monitored portion of speech with each of the plurality of classifiers includes:
    comparing the monitored portion of speech to the one or more elements defined for each of the plurality of classifiers.

5. The computer-implemented method of claim 1 further comprising:
    transcribing the monitored portion of speech, thus defining a transcribed portion of speech.

6. The computer-implemented method of claim 5 further comprising:
    providing the transcribed portion of speech to the remote location.

7. A computer program product residing on a non-transitory computer readable medium having a plurality of instructions stored thereon which, when executed by a processor, cause the processor to perform operations comprising:
    monitoring a portion of speech on an automated speech recognition system that includes a plurality of classifiers, thus defining a monitored portion of speech, wherein speech recognition for the monitored portion of speech is performed without requiring predefined speech within the monitored portion of speech, wherein a length of the monitored portion of speech is based upon, at least in part, a maximum utterance length defined for the portion of speech, wherein an operation is defined for each of the plurality of classifiers, wherein the plurality of classifiers includes:
        a negative classifier, wherein the operation associated with the negative classifier is configured to ignore the monitored portion of speech;
        an embedded classifier, wherein the operation associated with the embedded classifier is configured to locally process the monitored portion of speech on a consumer electronic device; and
        a gate classifier, wherein the operation associated with the gate classifier is configured to remotely process the monitored portion of speech on the remote location;
    associating a confidence score concerning the monitored portion of speech with each of the plurality of classifiers, thus defining a plurality of confidence scores for the plurality of classifiers concerning the monitored portion of speech, wherein the plurality of classifiers identify, at least in part, whether to process the monitored portion of speech at one of a local location and a remote location; and
    if one of the plurality of confidence scores is an acceptable confidence score for a classifier of the plurality of classifiers, effectuating the operation defined for the classifier associated with the acceptable confidence score.

8. The computer program product of claim 7 further comprising:

receiving a semantic result in response to effectuating the operation defined for the classifier associated with the acceptable confidence score.

9. The computer program product of claim 7 wherein each of the plurality of classifiers defines one or more elements.

10. The computer program product of claim 9 wherein associating the confidence score concerning the monitored portion of speech with each of the plurality of classifiers includes:
   comparing the monitored portion of speech to the one or more elements defined for each of the plurality of classifiers.

11. The computer program product of claim 7 further comprising:
   transcribing the monitored portion of speech, thus defining a transcribed portion of speech.

12. The computer program product of claim 11 further comprising:
   providing the transcribed portion of speech to the remote location.

13. A computing system including a processor and memory configured to perform operations comprising:
   monitoring a portion of speech on an automated speech recognition system that includes a plurality of classifiers, thus defining a monitored portion of speech, wherein speech recognition for the monitored portion of speech is performed without requiring predefined speech within the monitored portion of speech, wherein a length of the monitored portion of speech is based upon, at least in part, a maximum utterance length defined for the portion of speech, wherein an operation is defined for each of the plurality of classifiers, wherein the plurality of classifiers includes:
      a negative classifier, wherein the operation associated with the negative classifier is configured to ignore the monitored portion of speech;
      an embedded classifier, wherein the operation associated with the embedded classifier is configured to locally process the monitored portion of speech on a consumer electronic device; and
      a gate classifier, wherein the operation associated with the gate classifier is configured to remotely process the monitored portion of speech on the remote location;
   associating a confidence score concerning the monitored portion of speech with each of the plurality of classifiers, thus defining a plurality of confidence scores for the plurality of classifiers concerning the monitored portion of speech, wherein the plurality of classifiers identify, at least in part, whether to process the monitored portion of speech at one of a local location and a remote location; and
   if one of the plurality of confidence scores is an acceptable confidence score for a classifier of the plurality of classifiers, effectuating the operation defined for the classifier associated with the acceptable confidence score.

14. The computing system of claim 13 further comprising:
   receiving a semantic result in response to effectuating the operation defined for the classifier associated with the acceptable confidence score.

15. The computing system of claim 13 wherein each of the plurality of classifiers defines one or more elements.

16. The computing system of claim 15 wherein associating the confidence score concerning the monitored portion of speech with each of the plurality of classifiers includes:
   comparing the monitored portion of speech to the one or more elements defined for each of the plurality of classifiers.

17. The computing system of claim 13 further comprising:
   transcribing the monitored portion of speech, thus defining a transcribed portion of speech.

18. The computing system of claim 17 further comprising:
   providing the transcribed portion of speech to the remote location.

* * * * *